United States Patent
Lin et al.

(10) Patent No.: US 9,637,893 B2
(45) Date of Patent: May 2, 2017

(54) NUT FOR PROVIDING QUICK ASSEMBLY AND DISASSEMBLY

(71) Applicant: Globe Union Industrial Corp., Taichung (TW)

(72) Inventors: Yiping Lin, Taichung (TW); Chaota Yang, Taichung (TW); Chuwan Hong, Taichung (TW)

(73) Assignee: GLOBE UNION INDUSTRIAL CORP., Taichung (TW)

( * ) Notice: Subject to any disclaimer, the term of this patent is extended or adjusted under 35 U.S.C. 154(b) by 531 days.

(21) Appl. No.: 14/321,653

(22) Filed: Jul. 1, 2014

(65) Prior Publication Data

US 2015/0043963 A1 Feb. 12, 2015

(30) Foreign Application Priority Data

Aug. 9, 2013 (CN) .................... 2013 2 0487668 U

(51) Int. Cl.
F16B 37/08 (2006.01)
E03C 1/04 (2006.01)

(52) U.S. Cl.
CPC ........ *E03C 1/0401* (2013.01); *F16B 37/0864* (2013.01); *Y10T 403/535* (2015.01)

(58) Field of Classification Search
CPC ...... F16B 37/08; F16B 37/0864; F16B 39/02; F16B 39/12; F16B 39/22; F16B 39/28; F16B 39/36
USPC .................. 411/267, 278, 432, 433, 437
See application file for complete search history.

(56) References Cited

U.S. PATENT DOCUMENTS

| | | | | |
|---|---|---|---|---|
| 1,201,022 A | * | 10/1916 | Conniff | F16L 19/04 285/387 |
| 3,168,333 A | * | 2/1965 | Dziura | F16L 37/1215 279/50 |
| 5,139,381 A | * | 8/1992 | Lubreski | F16B 37/0864 411/267 |
| 6,712,574 B1 | * | 3/2004 | Roopnarine | F16B 37/0857 411/267 |
| 8,231,318 B2 | * | 7/2012 | Pitsch | F16B 37/0864 411/270 |
| 8,257,004 B2 | * | 9/2012 | Smith | F16B 37/0857 403/109.5 |
| 8,534,974 B2 | * | 9/2013 | Smith | F16B 37/0857 411/261 |
| 2007/0286702 A1 | * | 12/2007 | Smith | F16B 37/0857 411/432 |

(Continued)

*Primary Examiner* — Roberta Delisle

(57) ABSTRACT

A nut is employed to fix a faucet on a wash basin or a kitchen basin and contains an external driving member and an internal screwing member. The external driving member includes a cylindrical fence, an accommodating cavity, a first edge, and a second edge; the cylindrical fence has at least one limiting block and a griping face. The internal screwing member is fitted into and retained with the accommodating cavity and includes an annular cliff, a through orifice, a third edge, and a fourth edge; the annular cliff has plural slots longitudinally extending and isometrically arranged to the fourth edge from the third edge so as to define a plurality of flexible retaining portions, each having an inner threaded section; the annular cliff also has at least one longitudinal recess for retaining with the at least one limiting block of the external driving member and has a contacting fringe.

20 Claims, 15 Drawing Sheets

(56) References Cited

U.S. PATENT DOCUMENTS

2009/0324364 A1* 12/2009 Smith ................ F16B 37/0857
  411/433
2012/0134764 A1* 5/2012 Smith .................... F16B 39/32
  411/267

* cited by examiner

NUT FOR PROVIDING QUICK ASSEMBLY AND DISASSEMBLY

FIELD OF THE INVENTION

The present invention relates to a nut for providing quick assembly and disassembly.

BACKGROUND OF THE INVENTION

A bath faucet or a kitchen faucet contains a screwing tube or a screw rod, such that the screwing tube is inserted through a fixing hole of a basin and then is screwed with a conventional nut, thereafter the nut abuts against a bottom fence of the basin, thereby fixing the faucet on the basin.

However, when fixing the faucet in a narrow space, the conventional nut is rotated repeatedly and troublesomely. To fix the faucet on the basin, some screwing tubes are prolonged, thus rotating the nut difficultly.

To solve above-mentioned problem, CN Publication No. 201206582Y disclosed a quick nut contains a first sleeve member and a second sleeve member. The first sleeve member has two limiting portions disposed on a bottom end thereof and expending and retracting flexibly, the first sleeve member is inserted through an orifice of the second sleeve member to fit with the second sleeve member. The second sleeve member has two abutting portions extending upwardly from a top end thereof. In assembly, the two limiting portions expand, and each limiting portion has a threaded section, a diameter of which is larger than that of the screwing tube, hence the first sleeve member and the second sleeve member are fitted on the screwing tube of the faucet until the two abutting portions of the second sleeve member contact with a bottom fence of the basin tightly. Thereafter, the first sleeve member is pushed upwardly so that the two limiting portions are retained by the second sleeve member to retract inwardly, and the threaded section of each limiting portion meshes with the screwing tube, the first sleeve member is rotated so that the two limiting portions are limited to retain with the screwing tube tightly.

However, the quick nut still has disadvantages as follows:

The two limiting portions of the first sleeve member are retracted inwardly, and the first sleeve member is inserted through the orifice of the second sleeve member to fit with the second sleeve member. Nevertheless, a width of each limiting portion is limited, and a meshing area between the threaded section and the screwing tube is quite small, thus casing poor screwing effect.

A width of each abutting portion of the second sleeve member is limited, so a forcing area between each abutting portion and the bottom fence of the basin is reduced to loosen the nut from the faucet.

To improve such a problem, at least one locking block and at least one rib are provided. But the at least one locking block is limited and cannot arrange circumferentially, so the user cannot press each limiting portion inwardly because of limited space, and each abutting portion of the second sleeve member cannot pass through a cutout or a size of each abutting portion is reduced. Accordingly, the first sleeve member cannot be held comfortably.

The threaded section of the first sleeve member is defined on an inner side of each limiting portion, and each limiting portion is arranged below the first sleeve member, an axial distance between the threaded section and the top end of the first sleeve member forms. Furthermore, each abutting portion extends upwardly from the top end of the second sleeve member, so an axial distance produces between the top end of the first sleeve member and the bottom fence of the basin. However, when the length of the screwing tube is short and a thickness of the basin is large, the screwing tube cannot screw with the nut.

The present invention has arisen to mitigate and/or obviate the afore-described disadvantages.

SUMMARY OF THE INVENTION

One aspect of the present invention is to provide nut for providing quick assembly and disassembly which is capable of overcoming the shortcomings of the conventional nut for fixing a faucet on a wash basin or a kitchen basin.

To obtain the above, a nut is employed to fix a faucet on a wash basin or a kitchen basin; the faucet includes a screwing tube disposed on a lower side thereof and extending out of a bottom fence of the wash basin or the kitchen basin via a fixing hole; the nut contains: an external driving member and an internal screwing member.

The external driving member is in a sleeve shape and includes a cylindrical fence and an accommodating cavity defined on at least an upper side of the cylindrical fence, a first edge formed around a top surface of the cylindrical fence, a second edge arranged around a bottom surface of the cylindrical fence; the cylindrical fence has at least one limiting block extending outwardly from an inner surface thereof opposite to the first edge; the cylindrical fence also includes a griping face formed on an outer surface thereof.

The internal screwing member is fitted into and retained with the accommodating cavity of the external driving member and is in a sleeve shape, the internal screwing member includes an annular cliff, a through orifice defined in the annular cliff, a third edge formed around a top end of the annular cliff, and a fourth edge arranged around a bottom end of the annular cliff; the annular cliff has plural slots longitudinally extending to the fourth edge from the third edge so as to define a plurality of flexible retaining portions, wherein when the internal screwing member is not fitted into and retained with the external driving member, the plurality of flexible retaining portions are in a flexible expending state, each flexible retaining portion has an inner threaded section formed on an inner wall thereof, wherein when each flexible retaining portion is in the flexible expending state, the screwing tube allows being inserted through the through orifice, and when each flexible retaining portion is in a flexible retracting state, the screwing tube is retained with each flexible retaining portion; the annular cliff also has at least one longitudinal recess for retaining with the at least one limiting block of the external driving member, such that the internal screwing member does not remove from the external driving member, and the external driving member moves between a releasing position and a forcing position along an axis direction; the releasing position is a lower dead point where the external driving member moves downwardly relative to the internal screwing member, and the forcing position is an upper dead point where the external driving member moves upwardly relative to the internal screwing member; when the external driving member is located at the releasing position, the plurality of flexible retaining portions of the internal screwing member are freely accommodated in the accommodating cavity and in the flexible expending state; when the external driving member is located at the forcing position, the plurality of flexible retaining portions of the internal screwing member are forced by the accommodating cavity to be in the retracting state; the annular cliff further has at least one peripheral groove circumferentially arranged around an upper side of an outer wall thereof and communicating with the at least one longitudinal recess, such that when the external driving member is located at the forcing position, the at least one limiting block is rotatably slid into and retained with the at least one peripheral groove so that the external driving member is fixed at the forcing position, and the internal screwing member is driven by the external driving member which is rotated; the annular cliff further has a contacting fringe formed thereon opposite to the third edge, such that when the plurality of flexible retaining portions of the internal screwing member retain with the screwing tube, the contacting fringe retains with or removes from the bottom fence of the wash basin.

Thereby, the nut of the present invention has advantages as follows:

1. When the external driving member is located at the releasing position, the plurality of flexible retaining portions of the internal screwing member are in the flexible expending state to allow inserting through the screwing tube, and as desiring to fix the faucet, the external driving member is pushed and pressed upwardly, the internal screwing member is driven by the external driving member to rotate, thereafter the screwing tube is locked on the wash basin, thereby fixing the faucet.

2. The plurality of flexible retaining portions of the internal screwing member are mounted on the external driving member in the flexible expending state, in other words, the plurality of flexible retaining portions will not be flexibly pressed in the flexible retracting state and are fixed on the external driving member easily. Accordingly, more plurality of flexible retaining portions are arranged on the internal screwing member, and a gap between any two flexible retaining portions is decreased to increase a meshing area between the plurality of flexible retaining portions and the screwing tube, thus locking the screwing tube tightly and preventing a removal of the nut.

3. The contacting fringe of the internal screwing member contacts with the bottom fence of the wash basin tightly to lock the screwing tube and the faucet fixedly.

4. The nut is fixed and removed by holding the external driving member, and the internal screwing member moves and rotates in the accommodating cavity of the external driving member, so the user holds the external driving member easily and comfortably.

5. The nut is not only applicable for a screwing tube with a long length, but also for another screwing tube with a short length. Because the internal screwing member is located above the nut, and the inner threaded section is formed on the inner wall of each flexible retaining portion, the screwing tube slightly extends out of the bottom fence of the wash basin to connect with the internal screwing member securely.

6. When the nut is locked tightly, the external driving member is securely locked at the forcing position by using each limiting block.

DETAILED DESCRIPTION OF THE PREFERRED EMBODIMENTS

Figure 1:
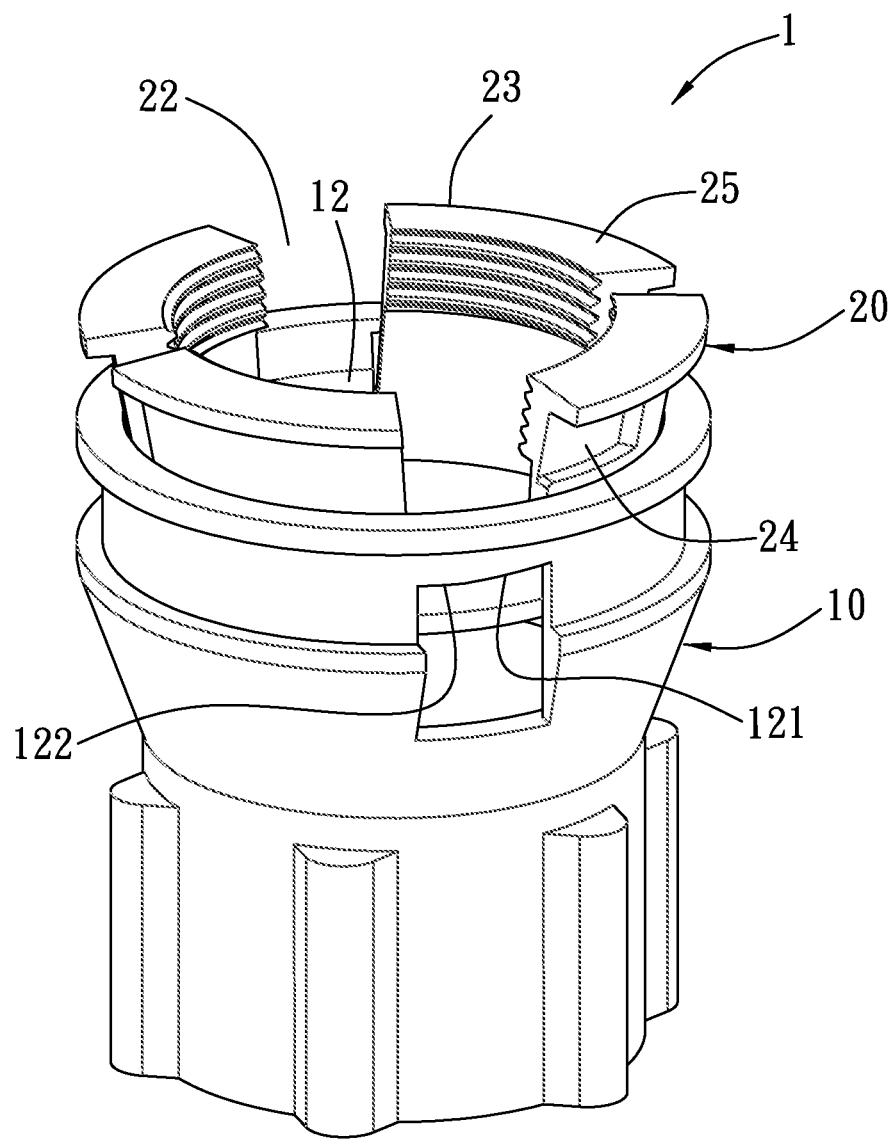
FIG. 1 is a perspective view showing the assembly of a nut for providing quick assembly and disassembly according to a first embodiment of the present invention.
Figure 13:
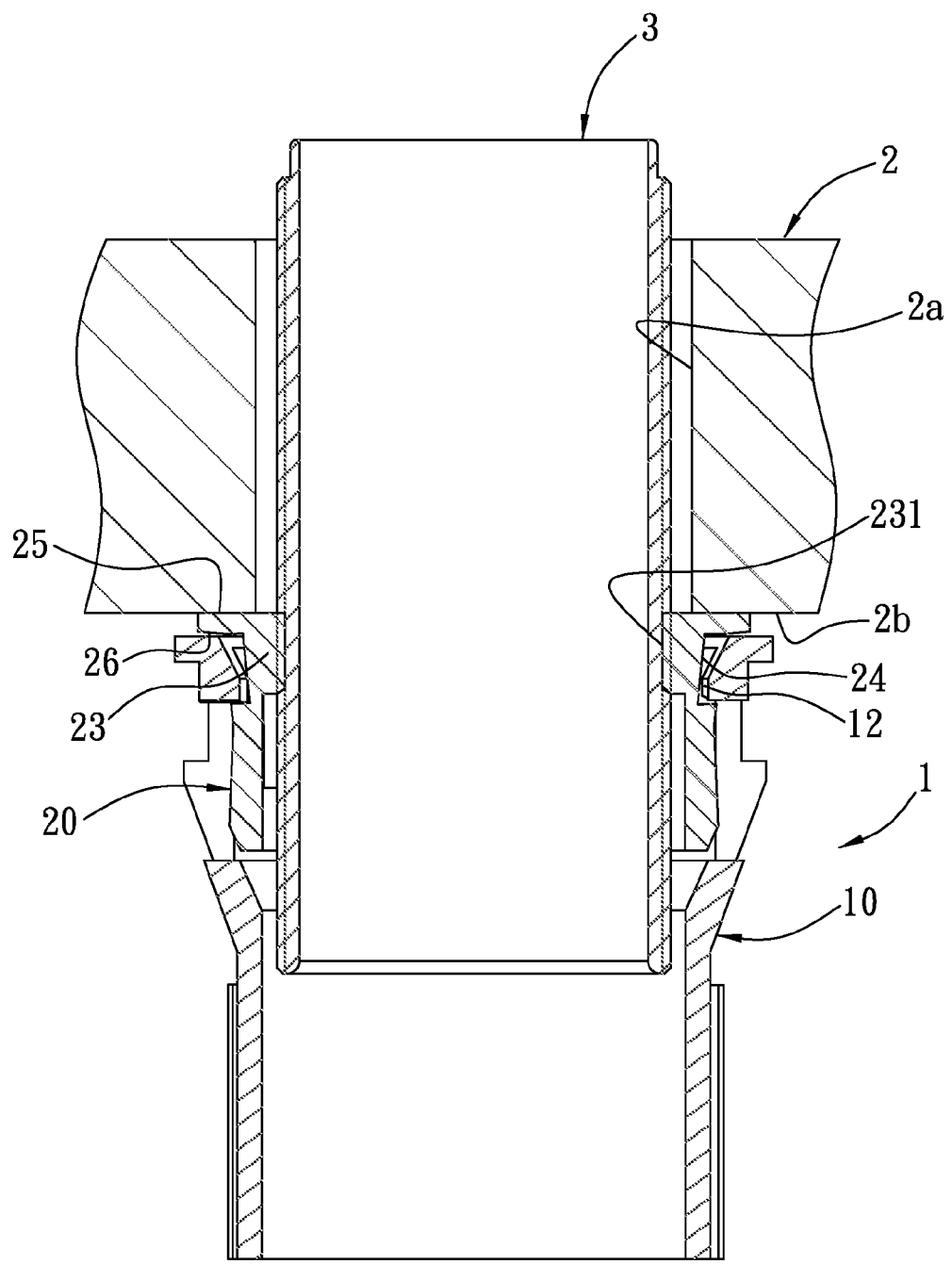
FIG. 13 is still another cross sectional view showing the operation of the nut for providing quick assembly and disassembly according to the first embodiment of the present invention.

With reference to FIGS. 1 and 13, a nut 1 according to a first embodiment of the present invention is employed to fix a faucet on a wash basin 2 or a kitchen basin 2, the faucet is a bath faucet or a kitchen faucet and includes a screwing tube 3 disposed on a lower side thereof and extending out of a bottom fence 2b of the wash basin 2 or the kitchen basin 2 via a fixing hole 2a.

Referring further to FIGS. 2 to 6, the nut 1 for providing quick assembly and disassembly comprises an external driving member 10 and an internal screwing member 20.

The external driving member 10 is in a sleeve shape and includes a cylindrical fence 11 and an accommodating cavity 111 defined on at least an upper side of the cylindrical fence 11, a first edge 112 formed around a top surface of the cylindrical fence 11, and a second edge 113 arranged around a bottom surface of the cylindrical fence 11.

Figure 3:
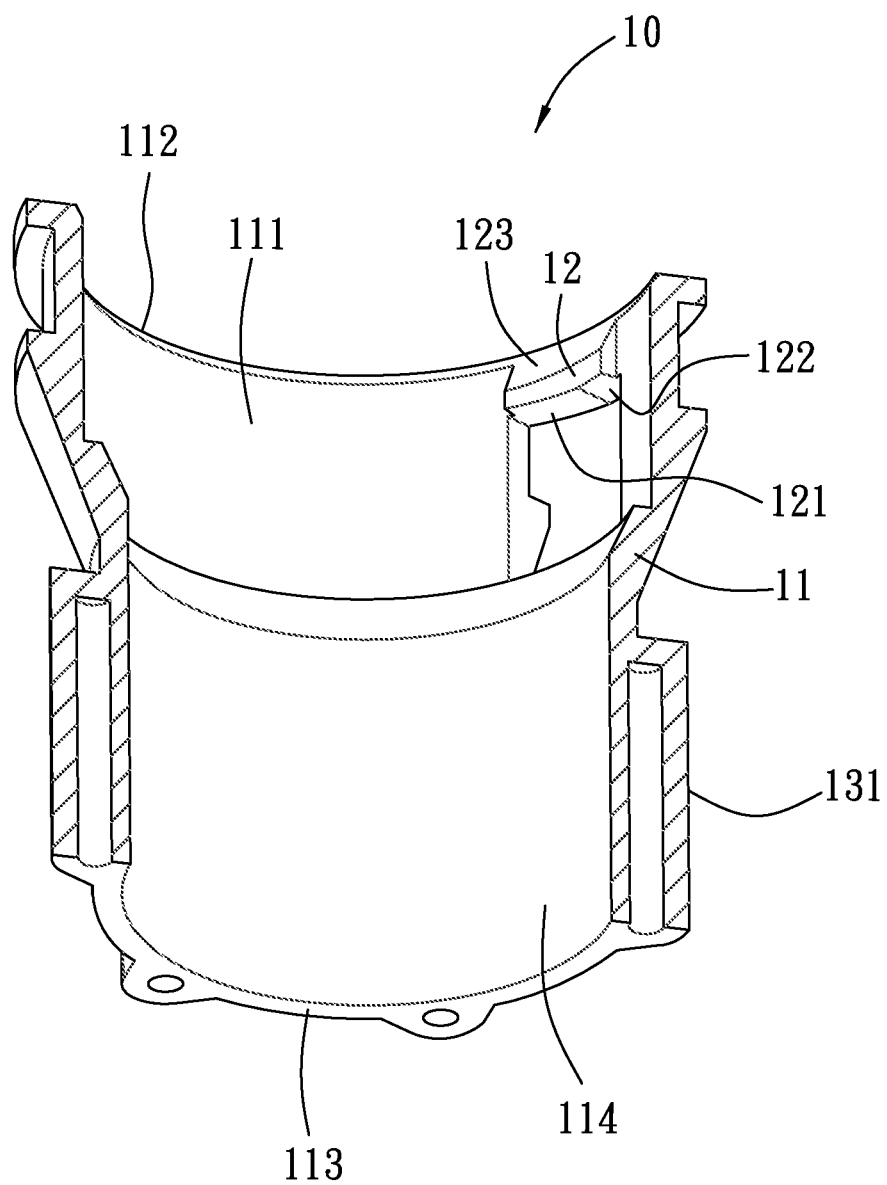
FIG. 3 is a perspective cross-sectional view showing the assembly of an external driving member of the nut for providing quick assembly and disassembly according to the first embodiment of the present invention.
Figure 4:
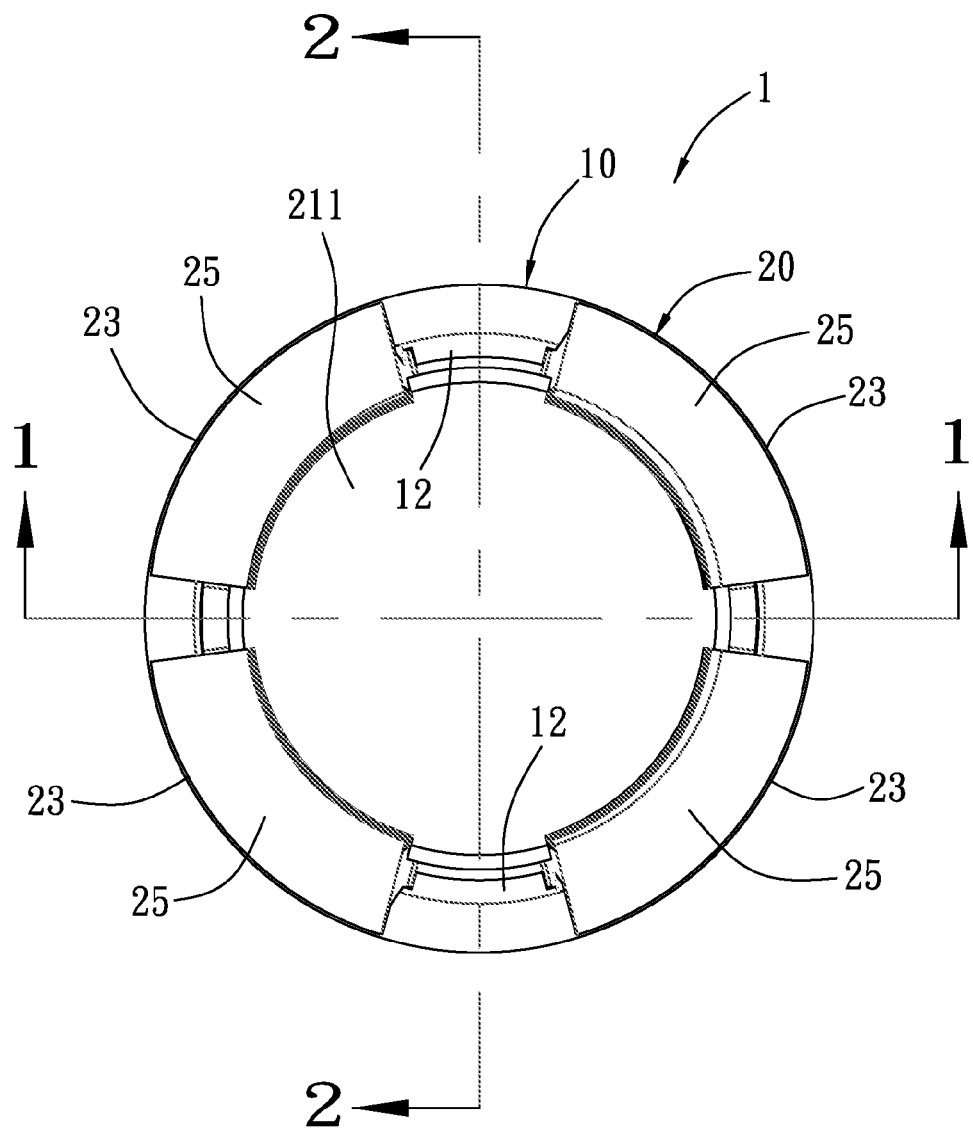
FIG. 4 is a top plan view showing the assembly of the nut for providing quick assembly and disassembly according to the first embodiment of the present invention.

As shown in FIG. 3, the cylindrical fence 11 has at least one limiting block 12 extending outwardly from an inner surface thereof opposite to the first edge 112; the cylindrical fence 11 also includes a griping face 13 formed on an outer surface thereof. In this embodiment, the griping face 13 has a plurality of longitudinal ribs 131 extending outwardly therefrom so as to be grasped and rotated by user's hand.

The internal screwing member 20 is fitted into and retained with the accommodating cavity 111 of the external driving member 10 and is in a sleeve shape. The internal screwing member 20 includes an annular cliff 21, a through orifice 211 defined in the annular cliff 21, a third edge 212 formed around a top end of the annular cliff 21, and a fourth edge 213 arranged around a bottom end of the annular cliff 21.

The annular cliff 21 has plural slots 22 longitudinally extending to the fourth edge 213 from the third edge 212 so as to define a plurality of flexible retaining portions 23, wherein when the internal screwing member 20 is not fitted into and retained with the external driving member 10, the plurality of flexible retaining portions 23 are in a flexible expending state. In this embodiment, there are four slots 22 longitudinally extending and isometrically arranged to the fourth edge 213 from the third edge 212 so as to define four flexible retaining portions 23.

Each flexible retaining portion 23 has an inner threaded section 231 formed on an inner wall thereof, wherein when each flexible retaining portion 23 is in the flexible expending state, the screwing tube 3 allows being inserted through the through orifice 211, and when each flexible retaining portion 23 is in a flexible retracting state, the screwing tube 3 is retained with each flexible retaining portion 23.

Figure 5:
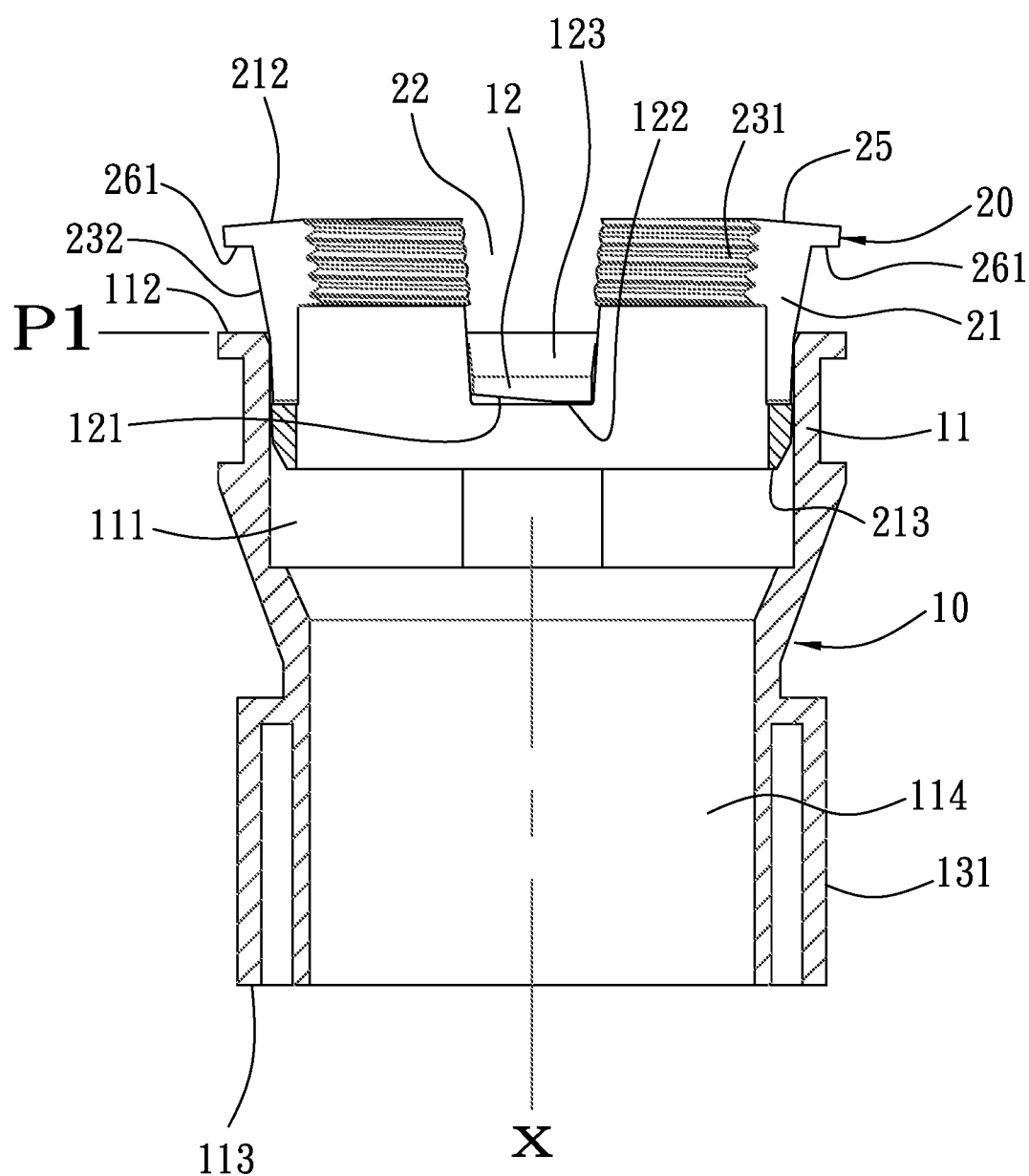
FIG. 5 is a cross sectional view taken along the lines 1-1 of FIG. 4.
Figure 9:
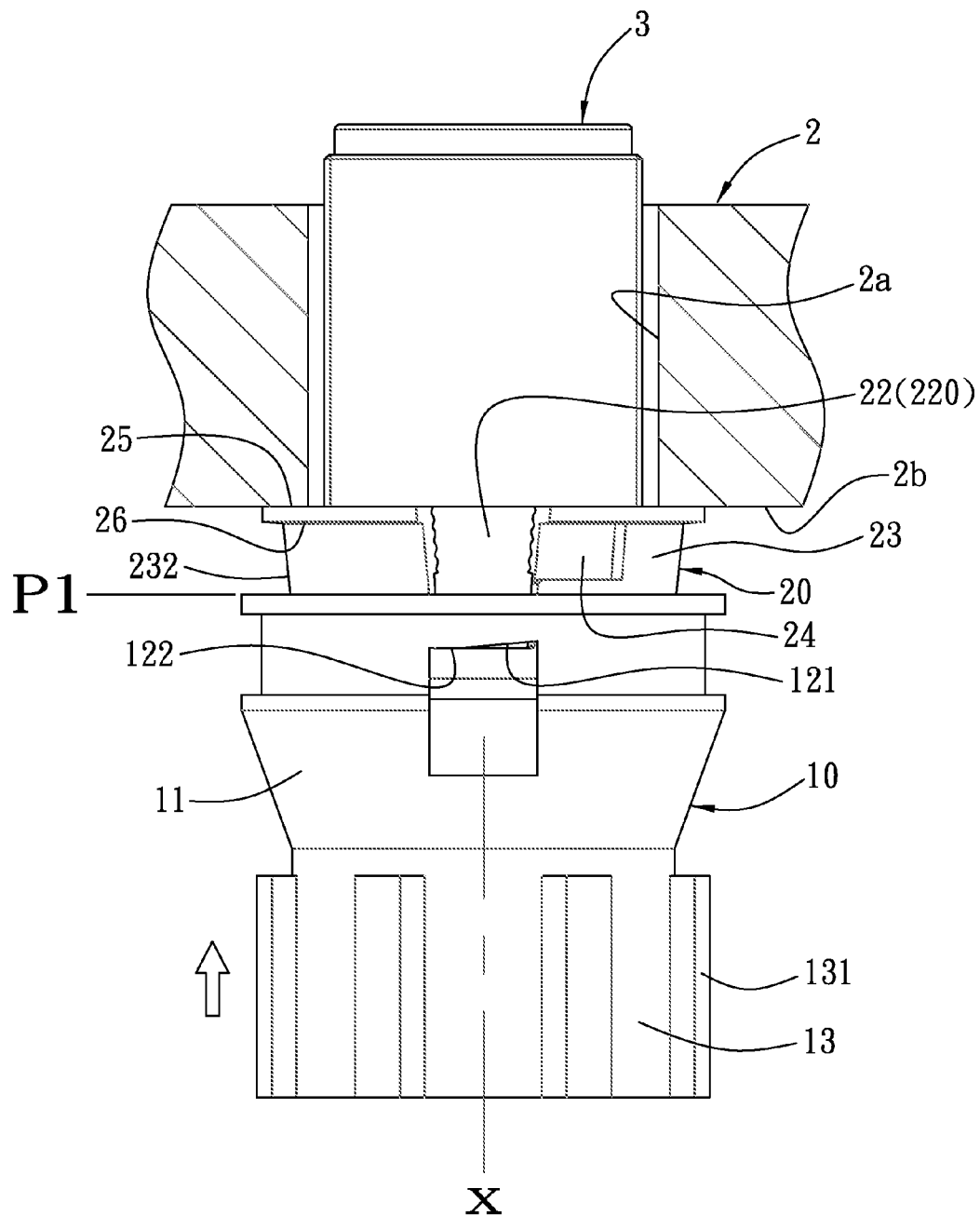
FIG. 9 is a cross sectional view showing the operation of the nut for providing quick assembly and disassembly according to the first embodiment of the present invention.
Figure 10:
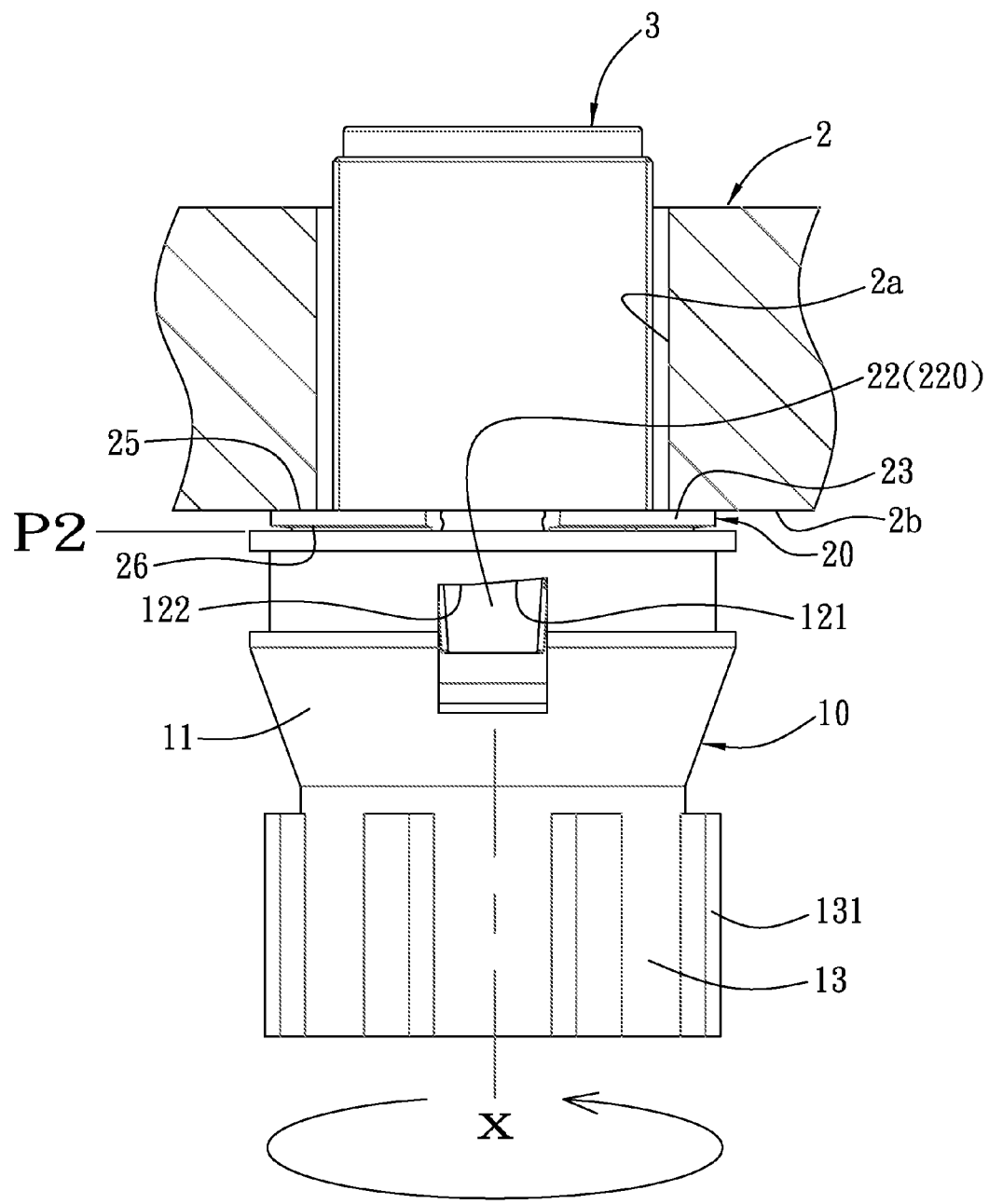
FIG. 10 is another cross sectional view showing the operation of the nut for providing quick assembly and disassembly according to the first embodiment of the present invention.

The annular cliff 21 also has at least one longitudinal recess 220 for retaining with the at least one limiting block 12 of the external driving member 10, such that the internal screwing member 20 does not remove from the external driving member 10, and the external driving member 10 moves between a releasing position P1 and a forcing position P2 along an axis direction X, thus moving the external driving member 10 relative to the internal screwing member 20 as shown in FIGS. 5, 9 and 10.

The releasing position P1 is a lower dead point where the external driving member 10 moves downwardly relative to the internal screwing member 20; and the forcing position P2 is an upper dead point where the external driving member 10 moves upwardly relative to the internal screwing member 20. Thereby, when the external driving member 10 is located at the releasing position P1, the plurality of flexible retaining portions 23 of the internal screwing member 20 are freely accommodated in the accommodating cavity 111 and in the flexible expending state; when the external driving member 10 is located at the forcing position P2, the plurality of flexible retaining portions 23 of the internal screwing member 20 are forced by the accommodating cavity 111 to be in the retracting state as shown in FIGS. 10 to 12.

Figure 11:
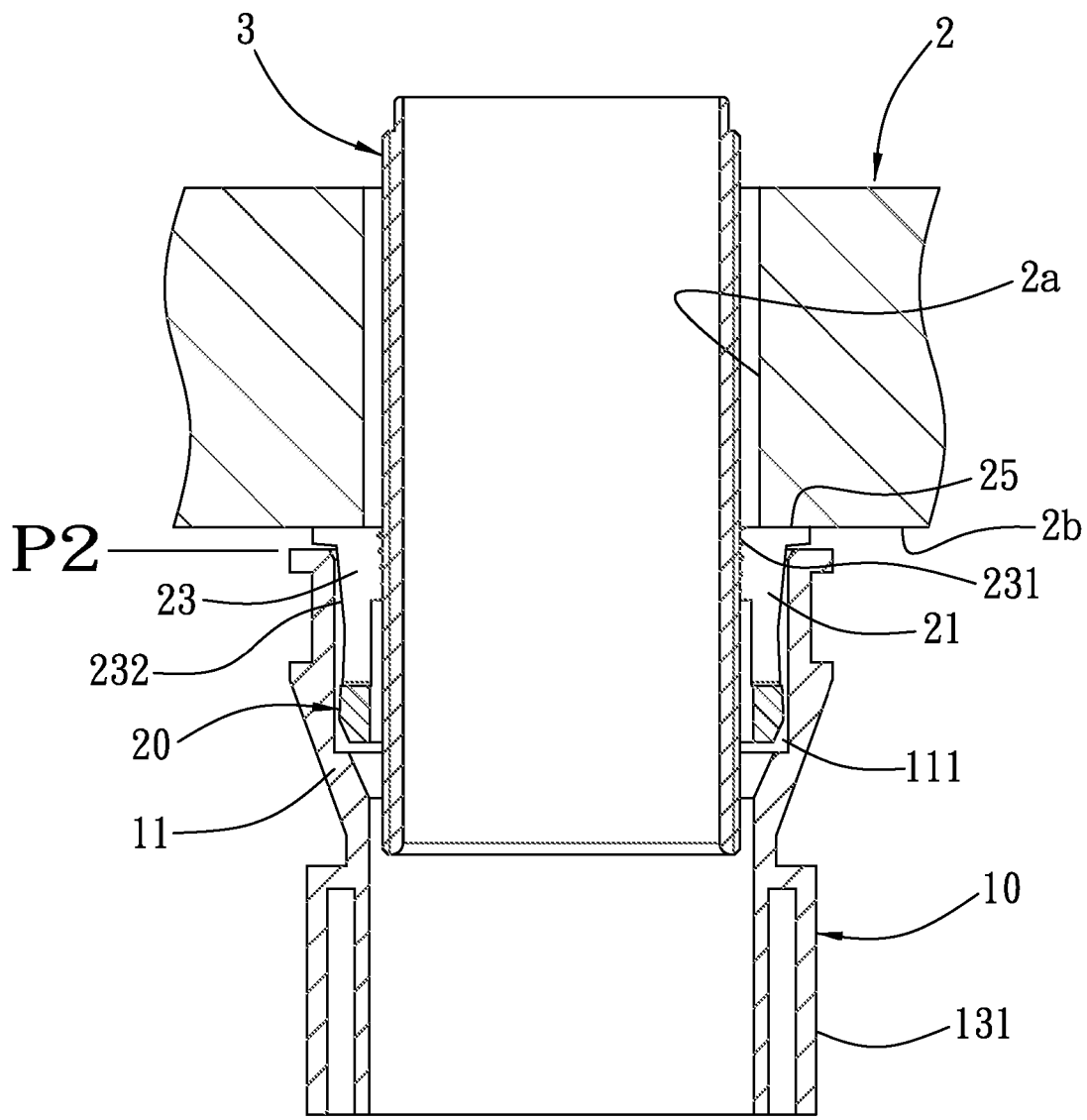
FIG. 11 is a cross sectional view of FIG. 10.
Figure 12:
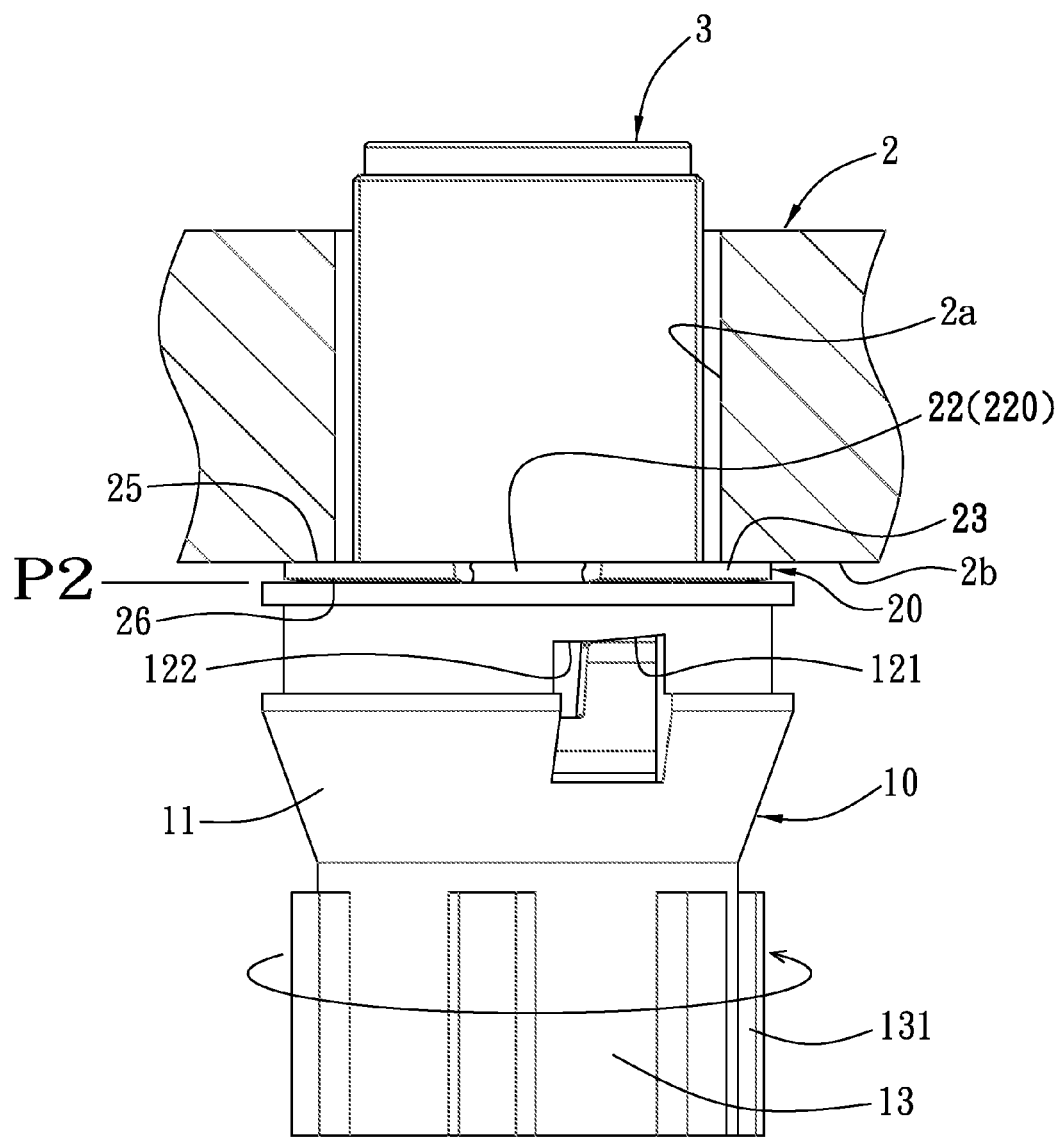
FIG. 12 is also another cross sectional view showing the operation of the nut for providing quick assembly and disassembly according to the first embodiment of the present invention.

The annular cliff 21 further has at least one peripheral groove 24 circumferentially arranged around an upper side of an outer wall thereof and communicating with the at least one longitudinal recess 220, such that when the external driving member 10 is located at the forcing position P2, the at least one limiting block 12 is rotatably slid into and retained with the at least one peripheral groove 24 so that the external driving member 10 is fixed at the forcing position P2 as illustrated in FIGS. 10 and 11, and the internal screwing member 20 is driven by the external driving member 10 which is rotated.

The annular cliff 21 has a contacting fringe 25 formed thereon opposite to the third edge 212, such that when the plurality of flexible retaining portions 23 of the internal screwing member 20 retain with the screwing tube 3, the contacting fringe 25 retains with or removes from the bottom fence 2b of the wash basin 2 as shown in FIGS. 9 and 10. In this embodiment, the contacting fringe 25 is defined by plural arcuate end faces of the plurality of flexible retaining portions 23 opposite to the third edge 212.

Preferably, the internal screwing member 20 includes two longitudinal recesses 220 symmetrically arranged thereon and formed by two of the four slots 22 symmetrical to the two longitudinal recesses 220. In this embodiment, there are two limiting blocks 12 provided on the external driving member 10. Preferably, a longitudinal recess 220 and a limiting block 12 opposite to the longitudinal recess 220 is provided, and the longitudinal recess 220 is formed by one of the four slots 22 symmetrical to the longitudinal recess 220.

Preferably, the internal screwing member 20 further includes two peripheral grooves 24 for retaining with the two limiting blocks 12.

Preferably, the annular cliff 21 further has plural defining shoulders 26 extending outwardly from the top end thereof opposite to the third edge 212, hence when the external driving member 10 moves toward the third edge 212 of the internal screwing member 20, i.e., when the external driving member 10 moves from the releasing position P1 to the forcing position P2, the first edge 112 of the cylindrical fence 11 abuts against the plural defining shoulders 26 of the internal screwing member 20, as illustrated in FIG. 10, to form the upper dead point where the external driving member 10 moves upwardly relative to the internal screwing member 20. It is to be noted that each flexible retaining portion 23 has a peripheral lip 261 extending outwardly therefrom opposite to the third edge 212 to form each of the plural defining shoulders 26.

In this embodiment, the plural defining shoulders 26 is biased against the first edge 112 of the cylindrical fence 11 to form the upper dead point where the external driving member 10 moves upwardly relative to the internal screwing member 20. In another embodiment, a bottom end of the accommodating cavity 11 abuts against a bottom end of the internal screwing member 20 to form the upper dead point as well.

Figure 2:
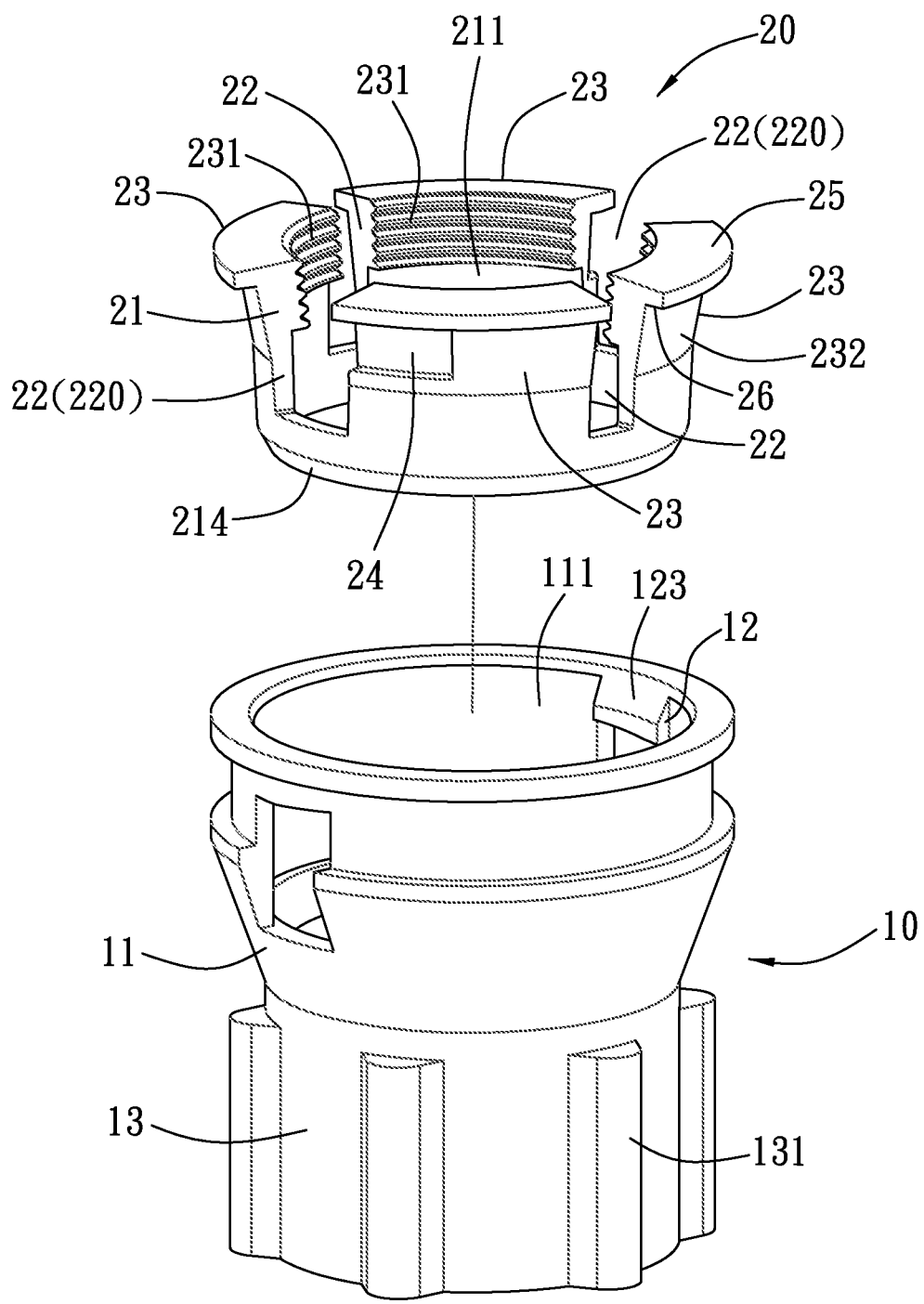
FIG. 2 is a perspective view showing the exploded components of the nut for providing quick assembly and disassembly according to the first embodiment of the present invention.

Preferably, when the plurality of flexible retaining portions 23 are in the flexible expending state, plural conical faces 232 form on outer walls of the plurality of flexible retaining portions 23; and the plural conical faces 232 of the plurality of flexible retaining portions 23, as illustrated in FIGS. 2 and 5, are forced by the accommodating cavity 111 to retract flexibly, when the external driving member 10 moves to the upper dead point from the lower dead point, i.e., the external driving member 10 moves to the forcing position P2 from the releasing position P1.

Figure 14:
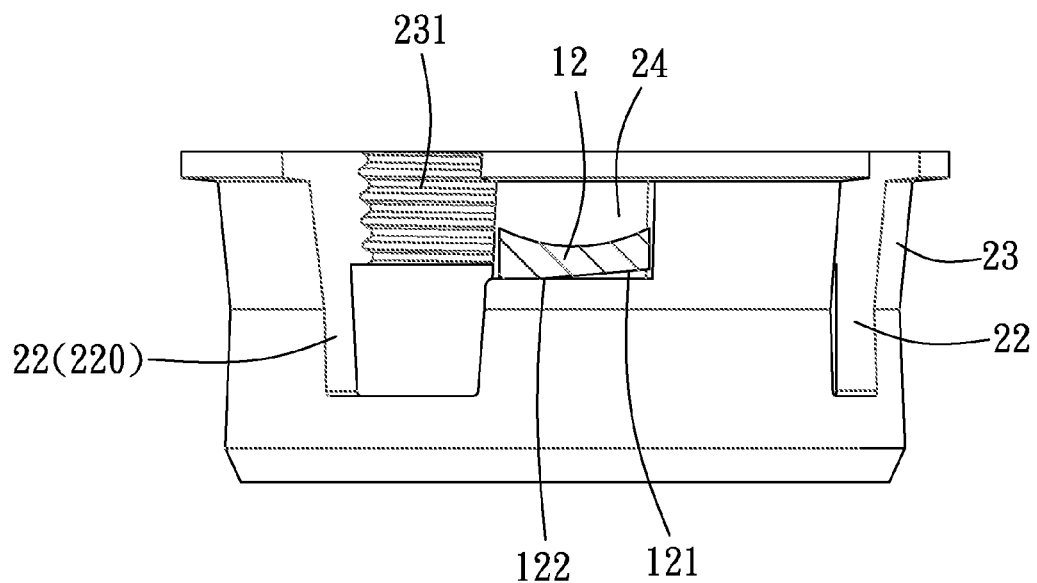
FIG. 14 is a cross sectional view showing the operation of the external driving member of the nut for providing quick assembly and disassembly according to the first embodiment of the present invention.

It is preferable that each of the at least one limiting block 12 has a sliding surface 121 and a contacting face 122, such that each limiting block 12 slides into each of the at least one peripheral groove 24 by ways of the sliding surface 121, and the contacting face 122 contacts with each peripheral groove 24 after each limiting block 12 slides into each peripheral groove 24 as shown in FIGS. 2, 3 and 14; wherein the sliding surface 121 is an oblique surface and forms on a bottom surface of each limiting block 12 facing to the second edge 113, and the contacting face 122 is a flat surface and connects with the guiding surface 121.

The sliding surface 121 is arranged to guide each limiting block 12 to slide into each peripheral groove 24 and does not contact with each peripheral groove 24 after guiding each peripheral groove 24, in other words, only the contacting face 122 contacts with each peripheral groove 24 to generate a rotational resistance. Accordingly, the rotational resistance resists against a sliding of each limiting block 12, thus preventing a removal of the external driving member 10 from the internal screwing member 20. Furthermore, a friction force between the contacting fringe 25 of the internal screwing member 20 and the bottom fence 2b of the wash basin 2 will not produce, thereby removing the nut 1 quickly. When the external driving member 10 is rotated reversely, each limiting block 12 is rotatably slid out of each peripheral groove 24, hence the internal screwing member 20 will not be driven by the external driving member 10 to rotate, in case each limiting block 12 is not rotatably slid out of each peripheral groove 24.

Figure 6:
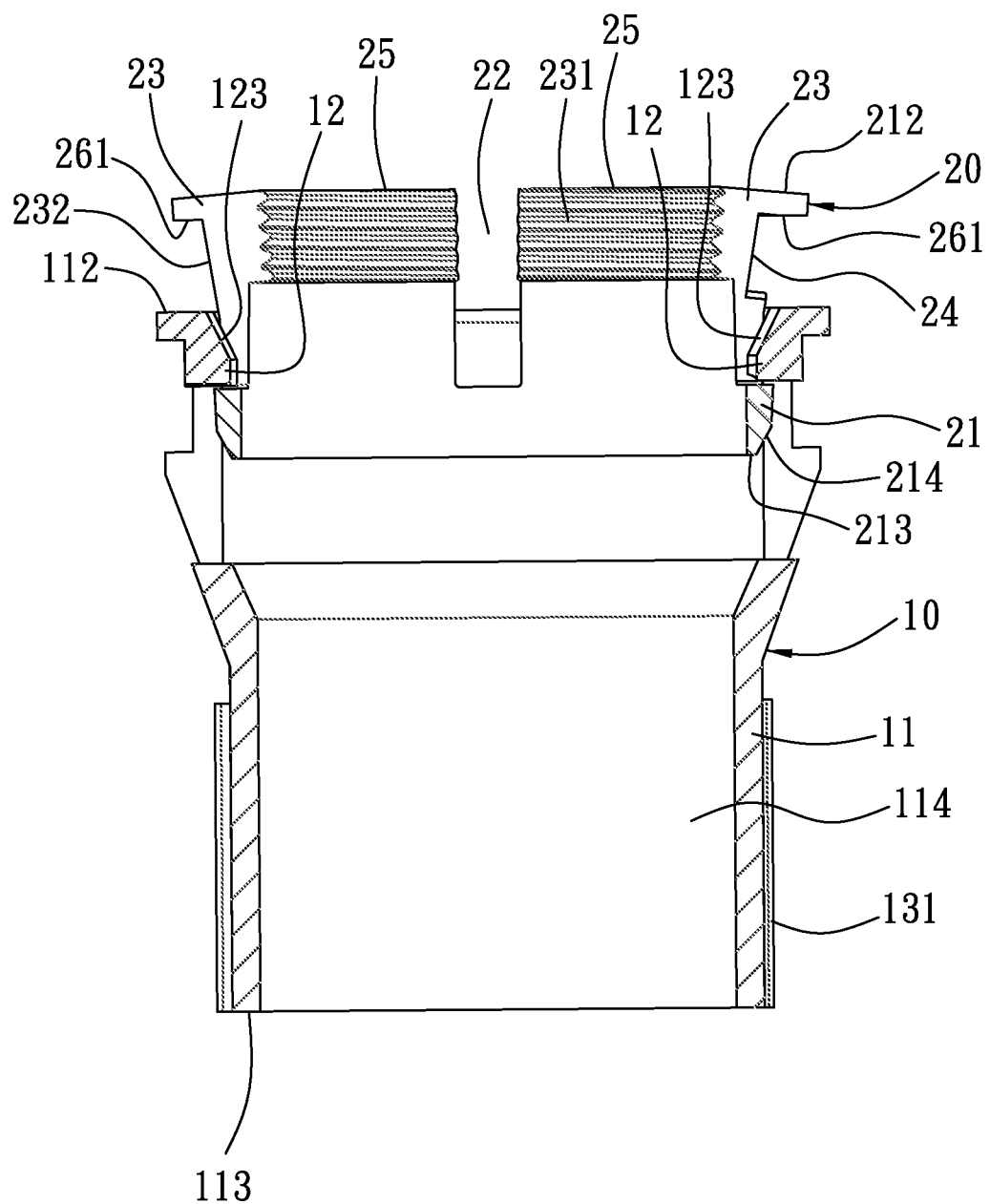
FIG. 6 is a cross sectional view taken along the lines 2-2 of FIG. 4.

With reference to FIGS. 2, 3 and 6, to retain the internal screwing member 20 in the accommodating cavity 111 of the external driving member 10, each limiting block 12 has a first tilted guiding face 123 opposite to the first edge 112, and the fourth edge 213 of the annular cliff 21 has a second tilted guiding face 214 at least opposite to the at least one longitudinal recess 220, such that each limiting block 12 slidably retains in the at least one longitudinal recess 220. It is to be noted that the fourth edge 213 of the annular cliff 21 has a guiding corner arranged thereon to form the second tilted guiding face 214 in this embodiment.

Figure 7:
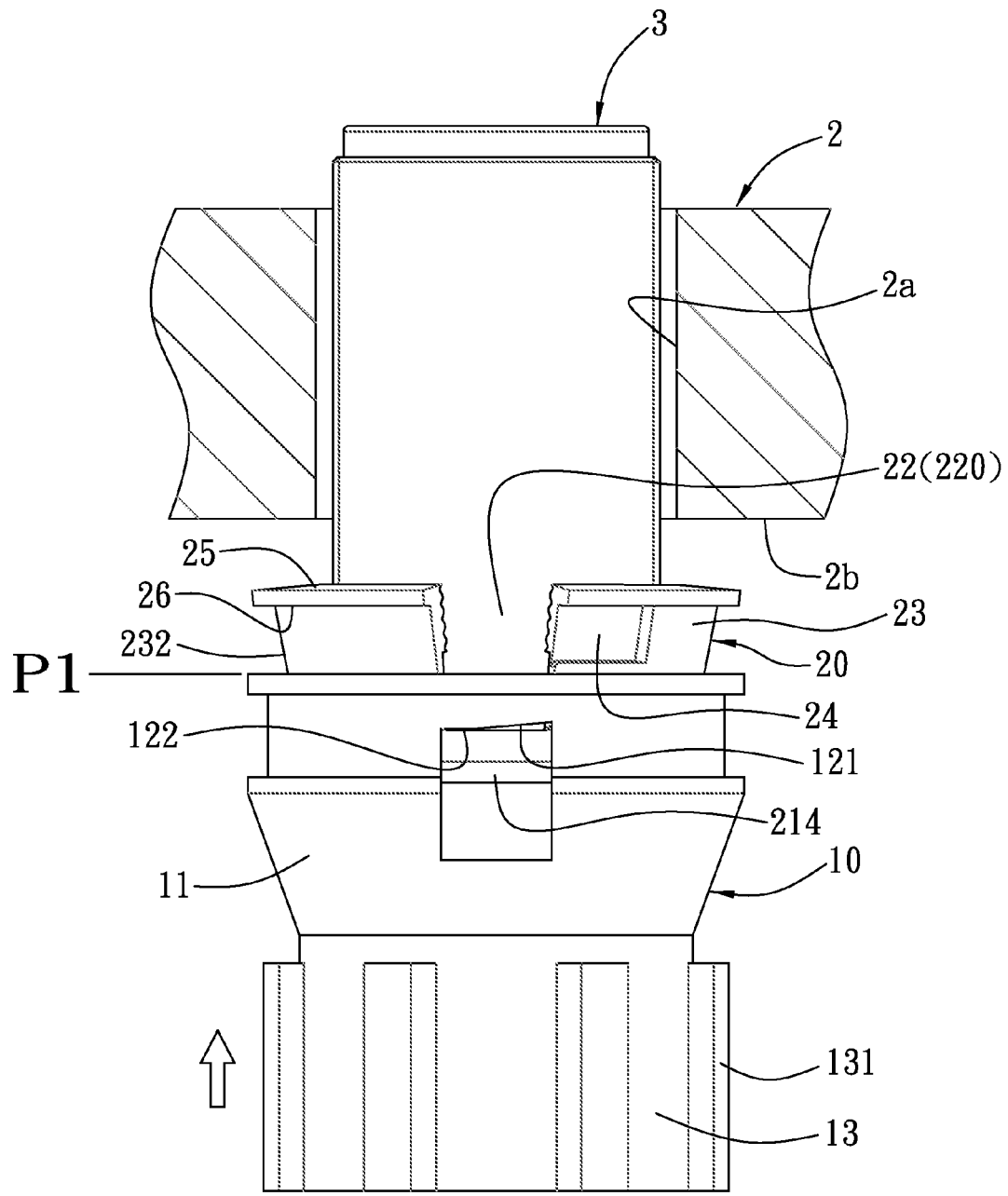
FIG. 7 is a cross sectional view showing the operation of the nut for providing quick assembly and disassembly according to the first embodiment of the present invention.
Figure 8:
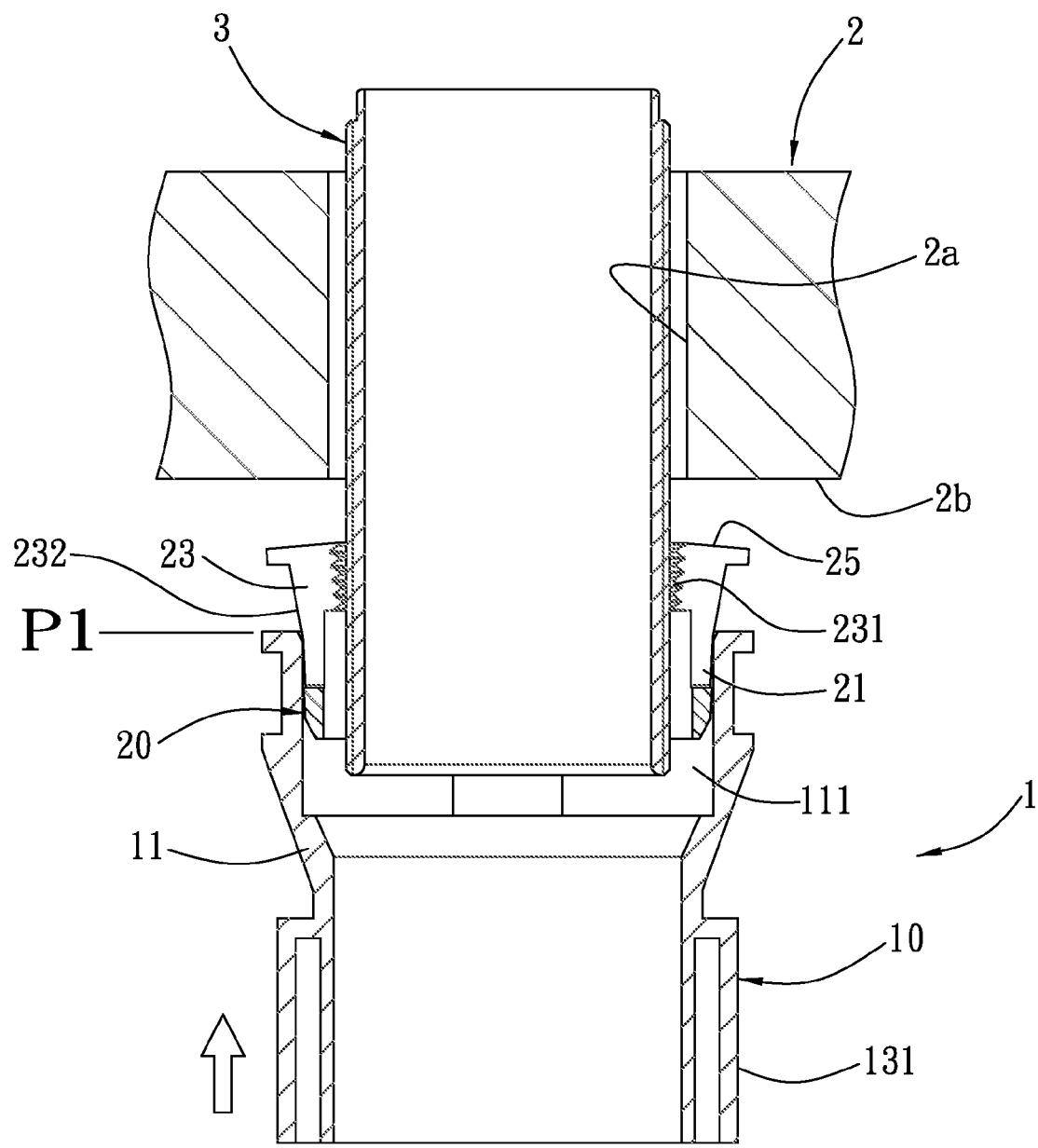
FIG. 8 is a cross sectional view of FIG. 7.

The nut 1 of this embodiment is employed to fix the faucet on the wash basin 2 and its operation contains steps of:

a. inserting the screwing tube 3 of the faucet downwardly from the fixing hole 2a of the wash basin 2;

b. fitting the nut 1 upwardly onto the screwing tube 3 so that the contacting fringe 25 of the internal screwing member 20 contacts with the bottom fence 2b of the wash basin 2 as illustrated in FIGS. 7 to 9; wherein before the nut 1 is employed to fix the faucet, the external driving member 10 is located at the releasing position P1, so the plurality of flexible retaining portions 23 of the internal screwing member 20 are in the flexible expending state, and the screwing tube 3 is inserted through the through orifice 211 in the plurality of flexible retaining portions 23 and an aperture 114 below the external driving member 10; in other words, the user holds the griping face 13 of the external driving member 10 so that the nut 1 is fitted upwardly onto the screwing tube 3 until the contacting fringe 25 of the internal screwing member 20 contacts with the bottom fence 2b of the wash basin 2;

c. pushing the external driving member 10 upwardly to the forcing position P2 from the releasing position P1;

wherein when the contacting fringe 25 of the internal screwing member 20 contacts with the bottom fence 2b of the wash basin 2, due to the internal screwing member 20 is stopped by the bottom fence 2b of the wash basin 2, the user pushes the external driving member 10 upwardly as illustrated in FIG. 9, hence each limiting block 12 moves upwardly along each of the at least one longitudinal recess 220 so that the external driving member 10 is forced to move toward the forcing position P2 from the releasing position P1 as illustrated in FIGS. 10 and 11, for example, the plurality of flexible retaining portions 23 of the internal screwing member 20 are pressed flexibly to be in the flexible retracting state, the inner threaded section 231 meshes with outer threads of the screwing tube 3;

d. rotating the external driving member 10 to fix the faucet on the wash basin 2; wherein when the external driving member 10 moves upwardly toward the forcing position P2, it is rotated to a locking direction so that each limiting block 12 is rotatably slid into each peripheral groove 24 as shown in FIG. 12; thereafter the internal screwing member 20 is driven by the external driving member 10 to rotate, and the contacting fringe 25 contacts with the bottom fence 2b of the wash basin 2, thus fixing the faucet as illustrated in FIG. 13. Accordingly, the contacting face 122 of each limiting block 12 contacts with each peripheral groove 24 of the internal screwing member 20 to generate the rotational resistance, and the rotational resistance is against the sliding of each limiting block 12, thus preventing the removal of the external driving member 10 from the internal screwing member 20.

The nut 1 is also used to remove the faucet from the wash basin 2, for example, the external driving member 10 is rotated reversely so that each limiting block 12 is rotatably slid out of each peripheral groove 24 and then slides into each of the at least one longitudinal recess 220, thereafter each flexible retaining portion 23 of the internal screwing member 20 expands flexibly so that a conical face 232 of each flexible retaining portion 23 expands flexibly to act an axial thrust load on the accommodating cavity 111 of the external driving member 10, and each limiting block 12 of the external driving member 10 sides downwardly toward the releasing position P1 from the forcing position P2 along each of the at least one longitudinal recess 220 so that inner threaded section 231 of each flexible retaining portion 23 removes from the outer threads of the screwing tube 3, and the nut 1 is slid downwardly to remove from the screwing tube 3, thus disassembling the faucet from the wash basin 2 quickly.

Referring to FIG. 8, a diameter of the upper side of the cylindrical fence 11 is larger than that of a lower side of the cylindrical fence 11 to define the accommodating cavity 111, and the diameter of the lower side of the cylindrical fence 11 is smaller than that of the upper side of the cylindrical fence 11 to define the aperture 114, wherein a diameter of the aperture 114 is larger than an diameter of the screwing tube 3 so as to insert the screwing tube 3, and the external driving member 10 is slid and rotated along the screwing tube 3 exactly, thus guiding the external driving member 10 and moving the nut 1 quickly and smoothly. Furthermore, the inner threaded section 231 of each flexible retaining portion 23 is aligned and meshed with the outer threads of the screwing tube 3 quickly and precisely.

Figure 15:
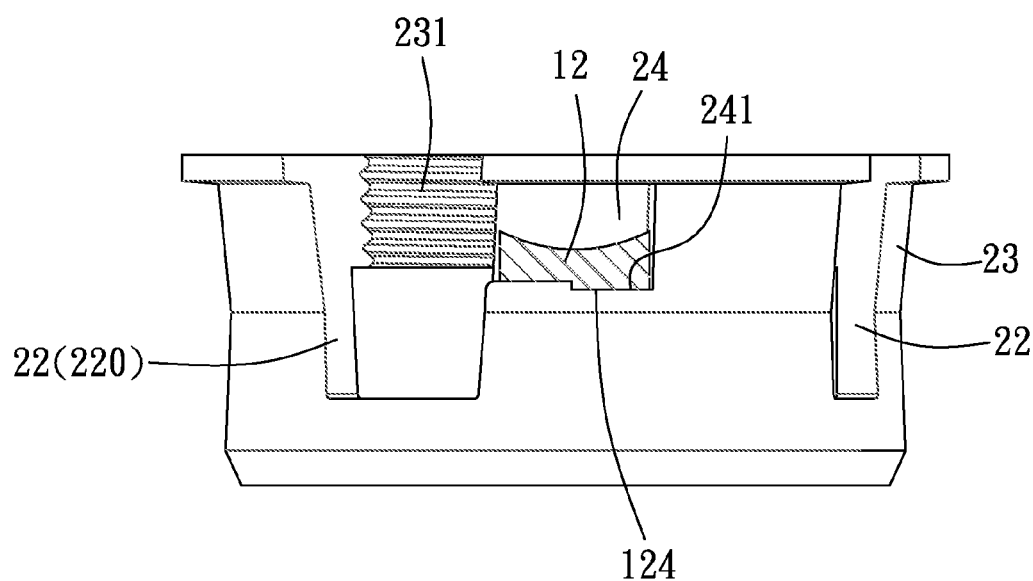
FIG. 15 is a cross sectional view showing the assembly of a limiting block and a peripheral groove of a nut for providing quick assembly and disassembly according to a second embodiment of the present invention.

As shown in FIG. 15, a nut 1 according to a second embodiment of the present invention comprises at least one limiting block 12 and at least one peripheral groove 24, wherein each limiting block 12 has a locking protrusion 124 for replacing the sliding surface 121 and the contacting face 122 of the first embodiment, and each peripheral groove 24 has a locking indentation 241 for retaining with the locking protrusion 124 of each limiting block 12 after each limiting block 12 is rotatably slid into each peripheral groove 24, such that each limiting block 12 is retained in each peripheral groove 24 securely. Preferably, the locking protrusion 124 is arranged on a bottom surface of each limiting block 12 facing to a third edge 113, and the locking indentation 241 is defined on a wall surface of each peripheral groove 24.

It is to be noted that when each limiting block 12 of second embodiment is rotatably slid into each peripheral groove 24 to drive the internal screwing member 20 to rotate, and the faucet is fixed on the wash basin so that the external driving member 10 is released by the user and is pushed by a plurality of flexible retaining portions 23 to move downwardly, thereafter the locking protrusion 124 of each limiting block 12 retains into the locking indentation 241 to limit each limiting block 12 to rotatably remove from each peripheral groove 24.

As desiring to remove each limiting block 12, the external driving member 10 is pushed and pressed upwardly so that the locking protrusion 124 of each limiting block 12 moves upwardly to remove from the locking indentation 241 of each peripheral groove 24, thereafter the locking protrusion 124 of each limiting block 12 is rotated back, thus removing the locking protrusion 124 from each peripheral groove 24.

Figure 16:
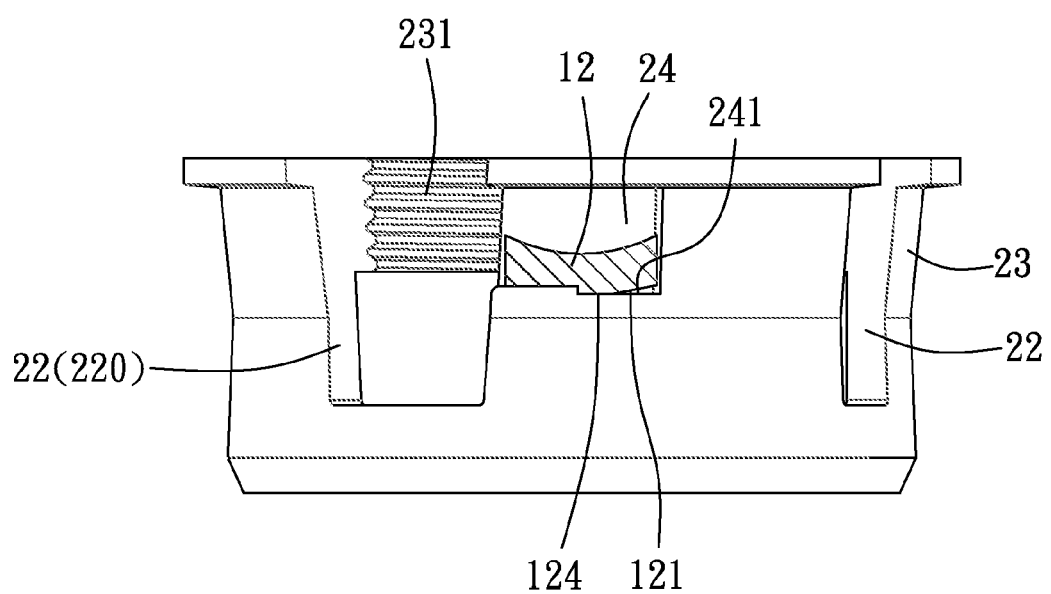
FIG. 16 is a cross sectional view showing the assembly of a limiting block and a peripheral groove of a nut for providing quick assembly and disassembly according to a third embodiment of the present invention.

As illustrated in FIG. 16, a nut 1 according to a third embodiment of the present invention comprises at least one limiting block 12 and at least one peripheral groove 24, and each peripheral groove 24 has a locking indentation 241, wherein each limiting block 12 has a sliding surface 121 and a locking protrusion 124 formed behind the sliding surface 121, such that each limiting block 12 has the sliding surface 121 for providing guiding and sliding function and has the locking protrusion 124 for retaining in the locking indentation 241 of each peripheral groove 24.

Thereby, the nut 1 of the present invention has advantages as follows:

1. When the external driving member 10 is located at the releasing position P1, the plurality of flexible retaining portions 23 of the internal screwing member 20 are in the flexible expending state to allow inserting through the screwing tube 3, and as desiring to fix the faucet, the external driving member 10 is pushed and pressed upwardly, the internal screwing member 20 is driven by the external driving member 10 to rotate, thereafter the screwing tube 3 is locked on the wash basin 2, thereby fixing the faucet.

2. The plurality of flexible retaining portions 23 of the internal screwing member 20 are mounted on the external driving member 10 in the flexible expending state, in other words, the plurality of flexible retaining portions 23 will not be flexibly pressed in the flexible retracting state and are fixed on the external driving member 10 easily. Accordingly, more plurality of flexible retaining portions 23 are arranged on the internal screwing member 20, and a gap between any two flexible retaining portions 23 is decreased to increase a meshing area between the plurality of flexible retaining portions 23 and the screwing tube 3, thus locking the screwing tube 3 tightly and preventing a removal of the nut 1.

3. The contacting fringe 25 of the internal screwing member 20 contacts with the bottom fence 2b of the wash basin 2 tightly to lock the screwing tube 3 and the faucet fixedly.

4. The nut 1 is fixed and removed by holding the external driving member 10, and the internal screwing member 20 moves and rotates in the accommodating cavity 111 of the external driving member 10, so the user holds the external driving member 10 easily and comfortably.

5. The nut 1 is not only applicable for a screwing tube 3 with a long length, but also for another screwing tube 3 with a short length. Because the internal screwing member 20 is located above the nut 1, and the inner threaded section 231 is formed on the inner wall of each flexible retaining portion 23, the screwing tube 3 slightly extends out of the bottom fence 2b of the wash basin 2 to connect with the internal screwing member 20 securely.

6. When the nut 1 is locked tightly, the external driving member 10 is securely locked at the forcing position P2 by using each limiting block 12.

While the preferred embodiments of the invention have been set forth for the purpose of disclosure, modifications of the disclosed embodiments of the invention as well as other embodiments thereof may occur to those skilled in the art. The scope of the claims should not be limited by the preferred embodiments set forth in the examples, but should be given the broadest interpretation consistent with the description as a whole.

What is claimed is:

1. A nut being employed to fix a faucet on a wash basin or a kitchen basin; the faucet including a screwing tube disposed on a lower side thereof and extending out of a bottom fence of the wash basin or the kitchen basin via a fixing hole; the nut comprising:

an external driving member being in a sleeve shape and including a cylindrical fence and an accommodating cavity defined on at least an upper side of the cylindrical fence, a first edge formed around a top surface of the cylindrical fence, a second edge arranged around a bottom surface of the cylindrical fence; the cylindrical fence having at least one limiting block extending outwardly from an inner surface thereof opposite to the first edge; the cylindrical fence also including a griping face formed on an outer surface thereof;

an internal screwing member being fitted into and retained with the accommodating cavity of the external driving member and being in a sleeve shape, the internal screwing member including an annular cliff, a through orifice defined in the annular cliff, a third edge formed around a top end of the annular cliff, and a fourth edge arranged around a bottom end of the annular cliff; the annular cliff having plural slots longitudinally extending to the fourth edge from the third edge so as to define a plurality of flexible retaining portions, wherein when the internal screwing member is not fitted into and retained with the external driving member, the plurality of flexible retaining portions are in a flexible expending state, each flexible retaining portion having an inner threaded section formed on an inner wall thereof, wherein when each flexible retaining portion is in the flexible expending state, the screwing tube allows being inserted through the through orifice, and when each flexible retaining portion is in a flexible retracting state, the screwing tube is retained with each flexible retaining portion; the annular cliff also has at least one longitudinal recess for retaining with the at least one limiting block of the external driving member, such that the internal screwing member does not remove from the external driving member, and the external driving member moves between a releasing position and a forcing position along an axis direction; the releasing position is a lower dead point where the external driving member moves downwardly relative to the internal screwing member, and the forcing position is an upper dead point where the external driving member moves upwardly relative to the internal screwing member; when the external driving member is located at the releasing position, the plurality of flexible retaining portions of the internal screwing member are freely accommodated in the accommodating cavity and in the flexible expending state; when the external driving member is located at the forcing position, the plurality of flexible retaining portions of the internal screwing member are forced by the accommodating cavity to be in the retracting state; the annular cliff further has at least one peripheral groove circumferentially arranged around an upper side of an outer wall thereof and communicating with the at least one longitudinal recess, such that when the external driving member is located at the forcing position, the at least one limiting block is rotatably slid into and retained with the at least one peripheral groove so that the external driving member is fixed at the forcing position, and the internal screwing member is driven by the external driving member which is rotated; the annular cliff further has a contacting fringe formed thereon opposite to the third edge, such that when the plurality of flexible retaining portions of the internal screwing member retain with the screwing tube, the contacting fringe retains with or removes from the bottom fence of the wash basin.

2. The nut as claimed in claim 1, wherein the longitudinal recess is formed by one of the plural slots.

3. The nut as claimed in claim 2, wherein the external driving member includes two limiting blocks symmetrically provided thereon; the internal screwing member includes two longitudinal recesses symmetrically arranged thereon and formed by two of the plural slots symmetrical to the two longitudinal recesses.

4. The nut as claimed in claim 1, wherein the external driving member includes at least two limiting blocks; and the internal screwing member includes at least two longitudinal recesses.

5. The nut as claimed in claim 1, wherein the internal screwing member includes two peripheral grooves.

6. The nut as claimed in claim 1, wherein the internal screwing member includes four slots for defining four flexible retaining portions.

7. The nut as claimed in claim 6, wherein the four slots are isometrically arranged along the annular cliff.

8. The nut as claimed in claim 1, wherein the plural slots are isometrically arranged along the annular cliff.

9. The nut as claimed in claim 1, wherein the contacting fringe is defined by plural arcuate end faces of the plurality of flexible retaining portions opposite to the third edge.

10. The nut as claimed in claim 1, wherein the annular cliff further has plural defining shoulders extending outwardly from the top end thereof opposite to the third edge, hence when the external driving member moves from the releasing position to the forcing position, the first edge of the cylindrical fence abuts against the plural defining shoulders of the internal screwing member to form the upper dead point.

11. The nut as claimed in claim 10, wherein each flexible retaining portion has a peripheral lip extending outwardly therefrom opposite to the third edge so as to form each of the plural defining shoulders.

12. The nut as claimed in claim 1, wherein when the plurality of flexible retaining portions are in the flexible expending state, plural conical faces form on outer walls of the plurality of flexible retaining portions; and the plural conical faces of the plurality of flexible retaining portions are forced by the accommodating cavity to retract flexibly, when the external driving member moves to the forcing position from the releasing position.

13. The nut as claimed in claim 1, wherein each of the at least one limiting block has a sliding surface and a contacting face, such that each limiting block slides into each of the at least one peripheral groove by ways of the sliding surface, and the contacting face contacts with each peripheral groove after each limiting block slides into each peripheral groove.

14. The nut as claimed in claim 13, wherein the sliding surface is an oblique surface and forms on a bottom surface of each limiting block facing to the second edge, and the contacting face is a flat surface and connects with the guiding surface.

15. The nut as claimed in claim 1, wherein each limiting block has a locking protrusion, and each peripheral groove has a locking indentation for retaining with the locking protrusion of each limiting block after each limiting block is rotatably slid into each peripheral groove, such that each limiting block is retained in each peripheral groove securely.

16. The nut as claimed in claim 15, wherein the locking protrusion is arranged on the bottom surface of each limiting block facing to a third edge, and the locking indentation is defined on a wall surface of each peripheral groove.

17. The nut as claimed in claim 1, wherein each limiting block of the external driving member has a sliding surface and a locking protrusion formed behind the sliding surface, such that each limiting block slides into each peripheral groove by ways of the sliding surface; and such that each limiting block slides into each peripheral groove by ways of the sliding surface; each peripheral groove has a locking indentation so that when each limiting block is rotated into each peripheral groove, the locking indentation retains with the locking protrusion.

18. The nut as claimed in claim 17, wherein the sliding surface is an oblique surface and forms on a bottom surface of each limiting block facing to the second edge; and the locking indentation is defined on a wall surface of each peripheral groove.

19. The nut as claimed in claim 1, wherein each limiting block has a first tilted guiding face opposite to the first edge; the fourth edge of the annular cliff has a second tilted guiding face at least opposite to the at least one longitudinal recess, such that each limiting block is guided by the first tilted guiding face and the second tilted guiding face to slidably retain in the at least one longitudinal recess.

20. The nut as claimed in claim 1, wherein the griping face has a plurality of longitudinal ribs extending outwardly therefrom.

* * * * *